United States Patent

Stevens

[11] Patent Number: 6,032,592
[45] Date of Patent: Mar. 7, 2000

[54] HAND HELD MOTOR DRIVEN APPLICATORS

[75] Inventor: Alec Martin Stevens, Cleveland, Australia

[73] Assignee: Weedbug Pty Ltd., Spring Hill Brisbane, Australia

[21] Appl. No.: 09/063,332

[22] Filed: Apr. 20, 1998

Related U.S. Application Data

[60] Provisional application No. 60/045,204, Apr. 30, 1997.

[51] Int. Cl.[7] ................................................. A01C 23/02
[52] U.S. Cl. ............................................... 111/7.2; 47/1.5
[58] Field of Search ..................... 47/1.5, 1.7; 172/41; 111/7.1, 1, 7.4, 127, 118; 239/145

[56] References Cited

U.S. PATENT DOCUMENTS

| | | | |
|---|---|---|---|
| 2,888,084 | 5/1959 | Trecker | 172/41 |
| 4,309,842 | 1/1982 | Jones | 47/1.5 |
| 4,464,862 | 8/1984 | Peterson et al. | 47/1.5 |
| 4,553,350 | 11/1985 | Hardy et al. | 47/1.5 |
| 4,719,719 | 1/1988 | Stevens | 47/1.5 |
| 4,911,247 | 3/1990 | Kuhlmann et al. | 172/41 |
| 5,826,370 | 10/1998 | Stevens | 47/1.5 |
| 5,875,587 | 3/1999 | Stevens | 47/1.5 |

FOREIGN PATENT DOCUMENTS 2089185  6/1982  United Kingdom ...................... 47/1.5

OTHER PUBLICATIONS

Weedwiper Mini Brochure, May 1982.

*Primary Examiner*—Victor Batson
*Attorney, Agent, or Firm*—Abelman, Frayne & Schwab

[57] ABSTRACT

A hand held motor driven applicator (10) for applying liquids including weedicides selectively to undesired plants. The applicator includes a motor (12), and a rotor assembly (22) including a rotatable wick support (41) having one or more applicator wicks (45) attached thereto. The rotator assembly is supported for rotation, in use, about a vertical axis (43) by support structure (18). A drive assembly (23) is operatively connected to the motor and rotor assembly for transferring rotary drive from the motor to the rotor assembly. A storage assembly (26) is in liquid communication with the applicator wicks for storing a quantity of liquid for supplying the wicks with liquid while the rotor assembly is rotating. An elongate handle (15) is operatively connected to the support structure so that a user can maintain the rotor assembly proximal to the surface of the ground so that the applicator wicks may apply liquid to selective plants upon contact.

10 Claims, 5 Drawing Sheets

HAND HELD MOTOR DRIVEN APPLICATORS

This application claims benefit of provisional application Ser. No. 60/045,204, filed Apr. 30, 1997.

TECHNICAL FIELD OF THE INVENTION

This invention relates to hand held motor driven applicators for applying liquids particularly weedicides selectively to undesired plants in a field, garden, crop or the like.

BACKGROUND ART

Machinery utilising rotating applicator wicks for controlling plant growth in broad acre situations is described in International Patent Application No. PCT/AU85/00039 to STEVENS WEEDBUG PTY LTD. Such machines typically include a plurality of relatively large rotor assemblies mounted on a frame for towing behind a tractor with each rotor assembly being driven by a hydraulic motor housed within the rotor assembly. While such machines are very effective for controlling plant/weed growth in a broad acre situation or a roadside situation they are generally not suitable for use in many hard to get at places such as under fences, in gullies and on dams, other banks and rises, and commonly undesired weed or other plant growth in such places is still controlled by the use of motor driven hand guided brush cutters or in some cases even by brush hooks and the like.

It will be appreciated that growth of undesired weeds and grasses is not effectively controlled by brush cutters as the undesired plants in many cases can regenerate after cutting at a greater rate than the desirable plants so that regular treatment is necessary. On the other hand, selectively killing undesired plants by chemical treatment allows the desirable plants, particularly grasses, to cover the area of ground where the undesired plant previously existed thereby keeping undesired plants choked out.

Hand held implements for selective chemical treatment of undesired plants have been available for some time but such implements typically involve a user wiping the selected plant with a stationary wick which draws liquid chemical from a reservoir. However, such implements typically require the user to wipe the wick several times over the plant to effectively apply the chemical so that the plant dies. Furthermore, such implements require individual selection of the plant to be killed by the operator and are thus not well suited to control undesired plants interspersed widely with desired plants over an area. In other words, such implements are not particularly suitable for selectively controlling plants according to height. Attempts have also been made to utilise free-wheeling rotary applicators with rotation being caused by engagement of the applicator with trees or other fixed objects in a field and thus is akin to the user wiping the plant to be treated with a wick. It is an object of the present invention to provide a hand held motor driven applicator for applying liquids particularly weedicides selectively to undesired plants whereby chemical control of such plants in relatively small areas can be achieved. It is a further object of the present invention to provide a hand held motor driven applicator which is effective for use over an entire field, garden or crop whereby the operator can apply a chemical to all plants above a predetermined height. It is still a further object of the present invention to provide an applicator which reliably applies liquid to the plants selected for treatment. Other objects and advantages of the present invention will hereinafter become apparent.

DISCLOSURE OF THE INVENTION

With the foregoing in view, the present invention resides broadly in a hand held motor driven applicator for applying liquids particularly weedicides selectively to undesired plants in a field, garden, crop or the like including:
  a motor;
  a rotor assembly including a rotatable wick support having one or more applicator wicks attached thereto, said rotor assembly being supported for rotation, in use, about a vertical axis by support means;
  drive means operatively connected to said motor and said rotor assembly for transferring rotary drive from said motor to said rotor assembly;
  storage means in liquid communication with said one or more applicator wicks for storing a quantity of liquid for supplying said one or more wicks with liquid while said rotor assembly is rotating; and
  an elongate handle operatively connected to said support means by which a user may maintain said rotor assembly proximal to the surface of the field, garden or crop, whereupon said applicator wicks may apply liquid to selected plants upon contact.

In one form of the invention, the motor is a high speed internal combustion engine mounted to an end of the elongate handle remote from the rotor assembly and the drive means includes a drive shaft or cable housed within the elongate handle and operatively connected to the rotor assembly via speed reduction means. However, in another form of the invention the motor is a battery powdered electric motor and in one such form it is mounted to the end of the handle remote from the rotor assembly while in another form, it is mounted at the lower end of the elongate handle adjacent the rotor assembly and a battery power supply is mounted at the other end of the elongate handle to provide some balance to the applicator, the battery power supply being connected to the motor by wires or other suitable electricity conductors. If a larger battery powered motor is required this too could be mounted at the end of the elongate handle remote from the rotor assembly to suitably balance the apparatus and the battery pack could be carried by the operator on his belt or back and be connected to the motor by suitable wires or the like. Typically, the wicks of the rotor assembly apply liquid chemical efficiently to weeds and grasses at a rotational speed of approximately 300 rpm so it will be seen that where an internal combustion engine is utilised, the speed reduction means needs to provide a reduction of about 12:1 or greater in order to keep the motor size at a suitable minimum for ease of carrying. Similar considerations apply to electric motors and battery packs also with speed reduction means being provided in order to keep the motor size to a desired minimum. However, it will be appreciated that apparatus according to the invention requires much less power and thus has the capacity to operate for much longer periods than motor driven brush-cutters, because the wicks simply rub the plants, preferably scoring the outer layer of the plant stem or leaves rather than cutting them completely. It is believed that scoring of the plant stems or leaves by the applicator wicks increases the kill rate, the weedicide being applied more effectively with the outer skin broken. The lower power requirements thus allow battery powered applicators according to the present invention to be a viable alternative to motor driven brush-cutters for weed and grass control.

Preferably the rotor assembly includes a centrally mounted shaft upstanding, in use, from said rotatable wick support and which is rotatably supported by complementary bearings or journals provided in said support means with drive being transferred to said rotor assembly by an angle drive operatively connected to said motor and said rotor assembly and being offset from said centrally mounted shaft. Suitably, offsetting of the angle drive allows the storage means to be connected to said rotor assembly for rotation therewith about said vertical axis or incorporated in said rotatable wick support.

Preferably, said support means is a housing which houses said rotatable wick support, said rotatable wick support is rotatably supported by said housing and has a central hub having a chamber provided therein which forms said storage means and the centrally mounted shaft is a large diameter thin walled hollow stub shaft which is integral with the upper wall of the central hub, the stub shaft being journalled in a complementary sleeve provided in the rotor housing. In such form of the invention drive may be provided via a ring gear on the rotor assembly on or about the hollow stub shaft and access to the storage means or reservoir formed in the hub may be provided via the open topped hollow of the stub shaft and an aperture formed centrally of the hub to which a filler hose may be coupled. Advantageously, such arrangement allows easy filling of said storage means from above the rotor assembly.

Preferably, the storage means is vented so that atmospheric pressure therein can be maintained during operation of the applicator. In one preferred form, the venting arrangement includes a tube or passage of small diameter extending circuitously around said storage means adjacent its upper end and in fluid communication therewith at its inner end and open to atmosphere at its other end. Advantageously, such arrangement prevents escape of liquid from said storage means through the vent if the applicator is operated at an inclined disposition or is stored in such a disposition, for example if the axis of rotation of the rotor assembly is horizontal.

In another aspect the invention resides broadly in a hand held motor driven applicator for applying liquids particularly weedicides selectively to undesired plants in a field, garden, crop or the like including:

a motor;

a rotor assembly including a rotatable wick support having one or more applicator wicks attached thereto, said rotor assembly being supported for rotation, in use, about a vertical axis by support means;

storage means in liquid communication with said one or more applicator wicks for storing a quantity of liquid for supplying said one or more wicks with liquid while said rotor assembly is rotating;

an elongate handle operatively connected to said support means by which a user may maintain said rotor assembly proximal to the surface of the field, garden or crop, whereupon said applicator wicks may apply liquid to selected plants upon contact;

drive means operatively connected to said motor and said rotor assembly for transferring rotary drive from said motor to said rotor assembly, said drive means including a drive shaft or cable housed in said elongate handle and drivably connected to said rotor assembly via speed reduction means;

said rotatable wick support including a lower part and an upper part, said lower part being disc-like in form with a cup-like central recess, and said upper part being secured to said lower part to define a chamber between said upper and lower parts and said chamber forming said storage means, and one or more apertures being provided in a wall of said recess and said one or more applicator wicks extending radially from said recess towards the periphery of said lower part and a portion of said one or more applicator wicks respectively passing through a respective aperture and being retained therein by a tapered gland.

BRIEF DESCRIPTION OF THE DRAWINGS

Other features and advantages of the invention will be apparent from the practical embodiment of the invention described in the accompanying drawings wherein.

DETAILED DESCRIPTION OF THE INVENTION

Figure 1:
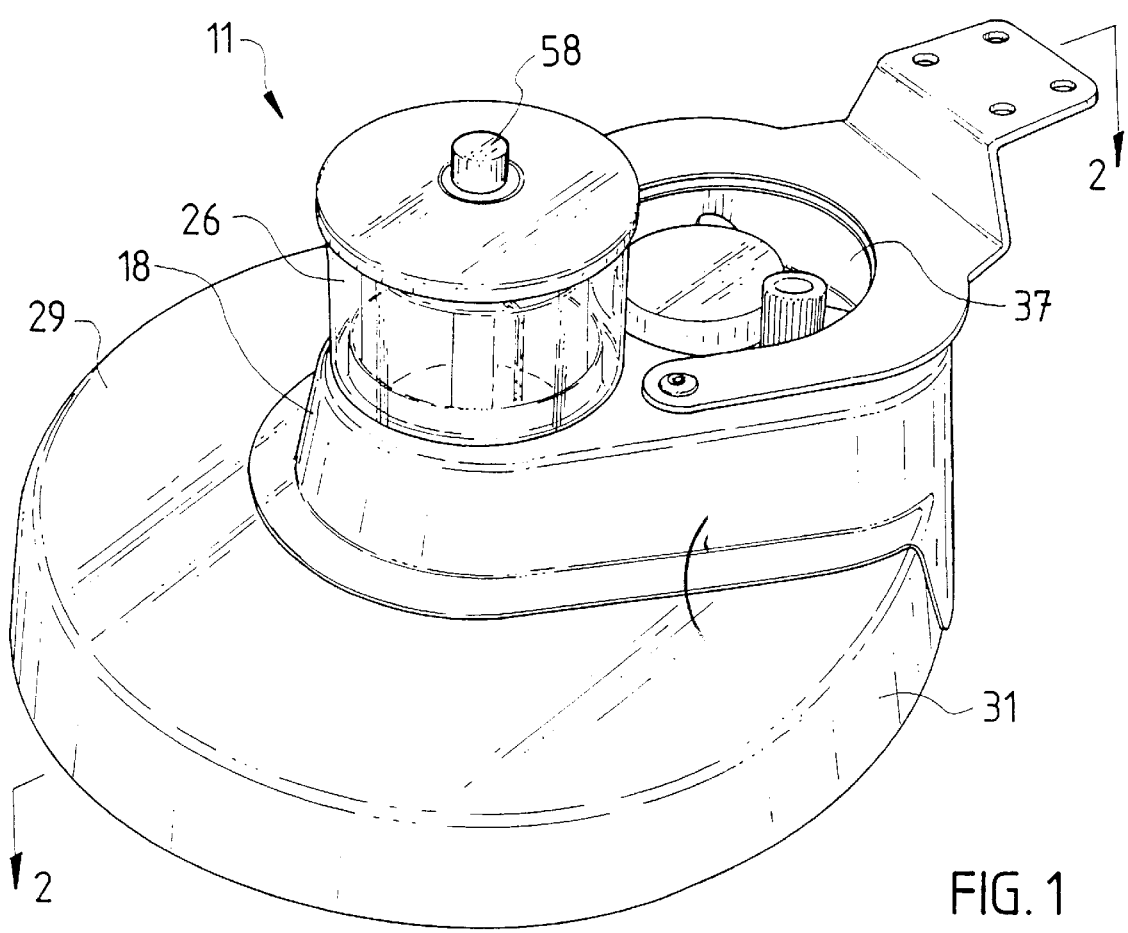
FIGS. 1, 2 and 3 are pictorial representations of the applicator head assembly of an applicator according to the invention.
Figure 2:
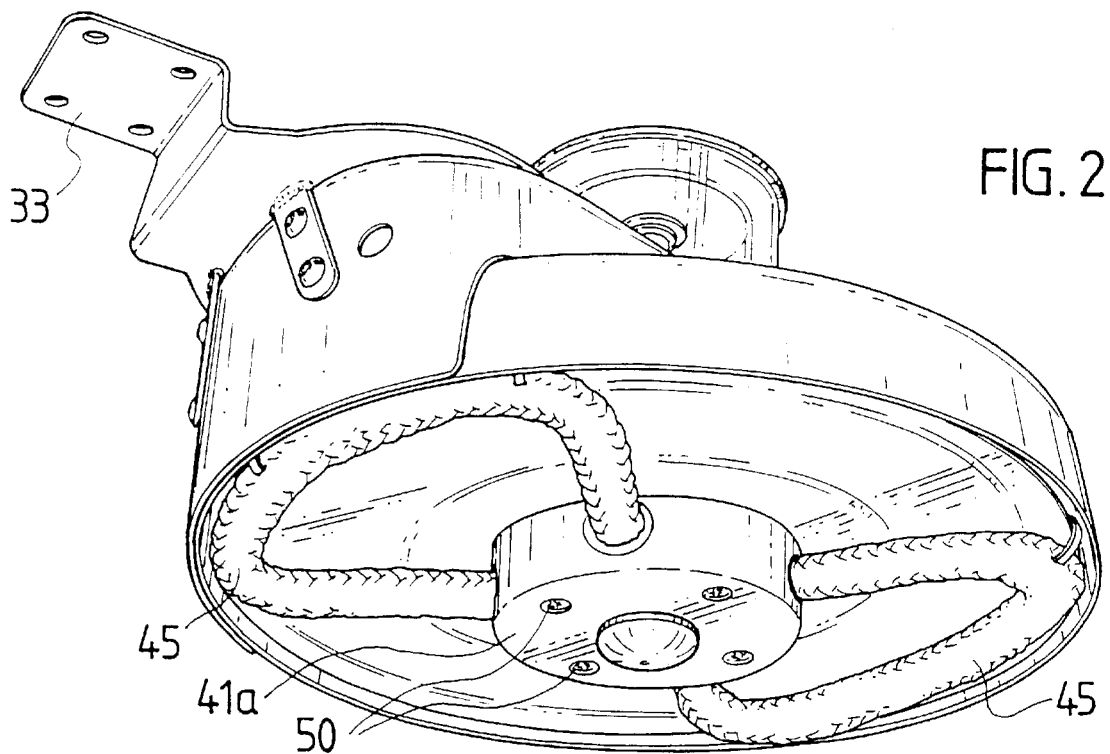
Figure 3:
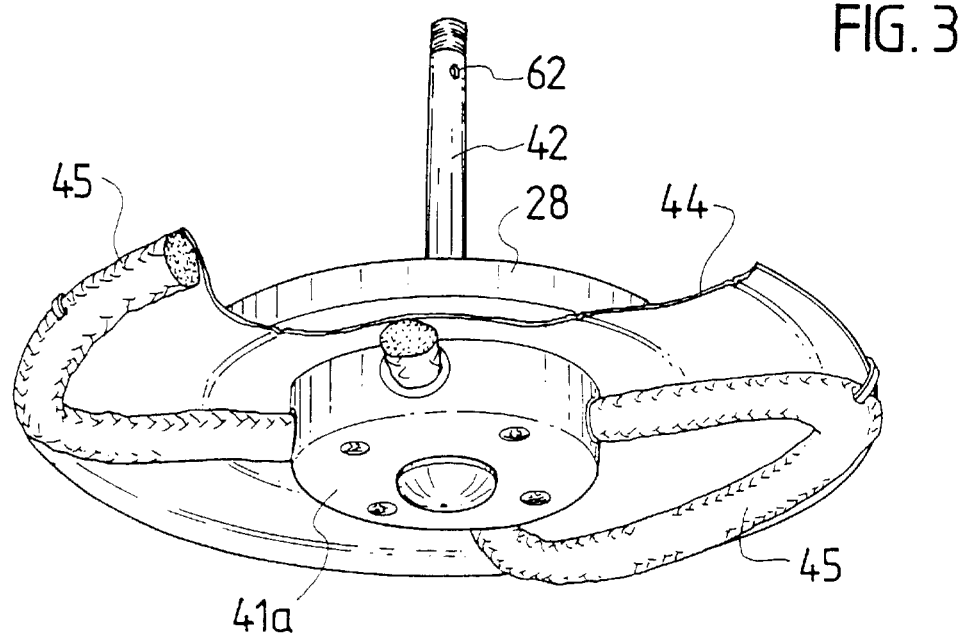

The hand held motor driven applicator 10 illustrated in the drawings includes an applicator head assembly 11 which is powered by a small two stroke petrol engine 12 spaced from the head assembly and transferring rotary drive via a drive shaft 13 and angle drive 14, the shaft being housed in a hollow tube 15 which is secured at its upper end to the engine frame and at its lower end to the housing 17 of the angle drive. The engine, drive shaft, shaft housing and angle drive are of the type utilised on hand held motor driven brush cutters. The angle drive housing is in turn secured to the applicator head assembly via the housing 18 such that it can be raised and lowered and tilted as desired by the operator holding on to the applicator by the handles 19 and 21 provided on the engine and hollow tube 15 respectively.

The applicator head assembly 11 includes a rotor assembly 22, a drive train 23 for transferring rotary drive from the angle drive shaft 24, a storage reservoir 26 and a top cover 27. The housing 18 includes a circular plate-like rotor cover portion 29 having a skirt 31 depending therefrom for shrouding the rotor assembly 22 and a drive cover portion 32 above the rotor cover portion for covering the drive train 23 and for attachment of the housing to the tube 15. The tube 15 is secured to the housing by a bracket 33 which is clamped thereto by clamp 34 and bolted to the skirt 31 and the drive cover by bolts 36. It will be seen that the angle drive shaft 24 extends into the housing through an aperture 37 provided in the upper face of the drive cover portion and engages with the drive train as will be described in more detail later. A second large aperture is provided in the drive train cover for receiving the storage reservoir.

The rotor assembly 22 includes an applicator head 41 which is securely screwed to a hollow support shaft 42 which is mounted in the housing 18 for rotation, in use, about a vertical axis 43. The applicator head includes a disc 44 having a diameter slightly smaller than the diameter of the housing inside the skirt 31 so that it can rotate therewithin, and a hub secured to the lower face of the disc 27 from which a pair of opposed applicator wicks 45 extend radially to the periphery of the disc, the wicks being attached to the disc at their outermost portions by straps 45a. A drive wheel 28 is secured to the upper side of the disc 44 and through the disc to the hub by four bolts 50 and is adapted to receive rotational drive from the engine as will be described more fully later.

The shaft 42 is mounted in two spaced apart bearings, a lower bearing 46 and an upper bearing 47, the lower bearing being mounted in a recess provided in the rotor cover portion 29 and the upper bearing being mounted in a recess provided in the upper end wall of the removable top cover 27. The top cover itself engages about a lip 48 upstanding from the upper wall of the drive cover portion of the housing 18. It will be seen that the spaced apart bearings 46 and 47 provide adequate support for the shaft 42, the top housing being well supported by the lip 48.

The storage reservoir 26 is cylindrical in form having a bottom end wall 51 and a top end wall 52 having aligned central apertures 53 and 54 provided therein respectively whereby the reservoir is slidably fitted to the hollow shaft 42. Gland type rubber seals are provided in the apertures 53 and 54 for sealing the reservoir with the shaft and for transmitting rotational drive from the shaft to the reservoir so that the reservoir rotates with the rotor assembly 22. Collars 56 and 57 are also secured to the lower end 51 and upper end 52 respectively for engaging with the lower and upper bearings 46 and 47 respectively. It will be seen that the reservoir is more or less clamped in operative engagement with the two bearings by the top cover 27 which itself is held in place by a top nut or cap 58 screwed to the upper end of the shaft 42. A vent tube 67 is secured to the upper end of the reservoir with one end 68 opening into the reservoir near to the hollow shaft 42 and the other end 69 opening just outside the cylindrical wall the tube making two full concentric coils between its ends about the axis 43 and being effective to allow air into the reservoir whilst the rotor assembly is rotating, the direction of the coils being such that any liquid which happens to be in the coils is forced back into the reservoir. The apparatus described in patent application PCT/AU95/00065 includes a similar venting arrangement and reference may be made to that application for a clearer understanding. The top cover 27 is also vented by aperture 70 provided in its cylindrical wall.

Figures 4, 5:
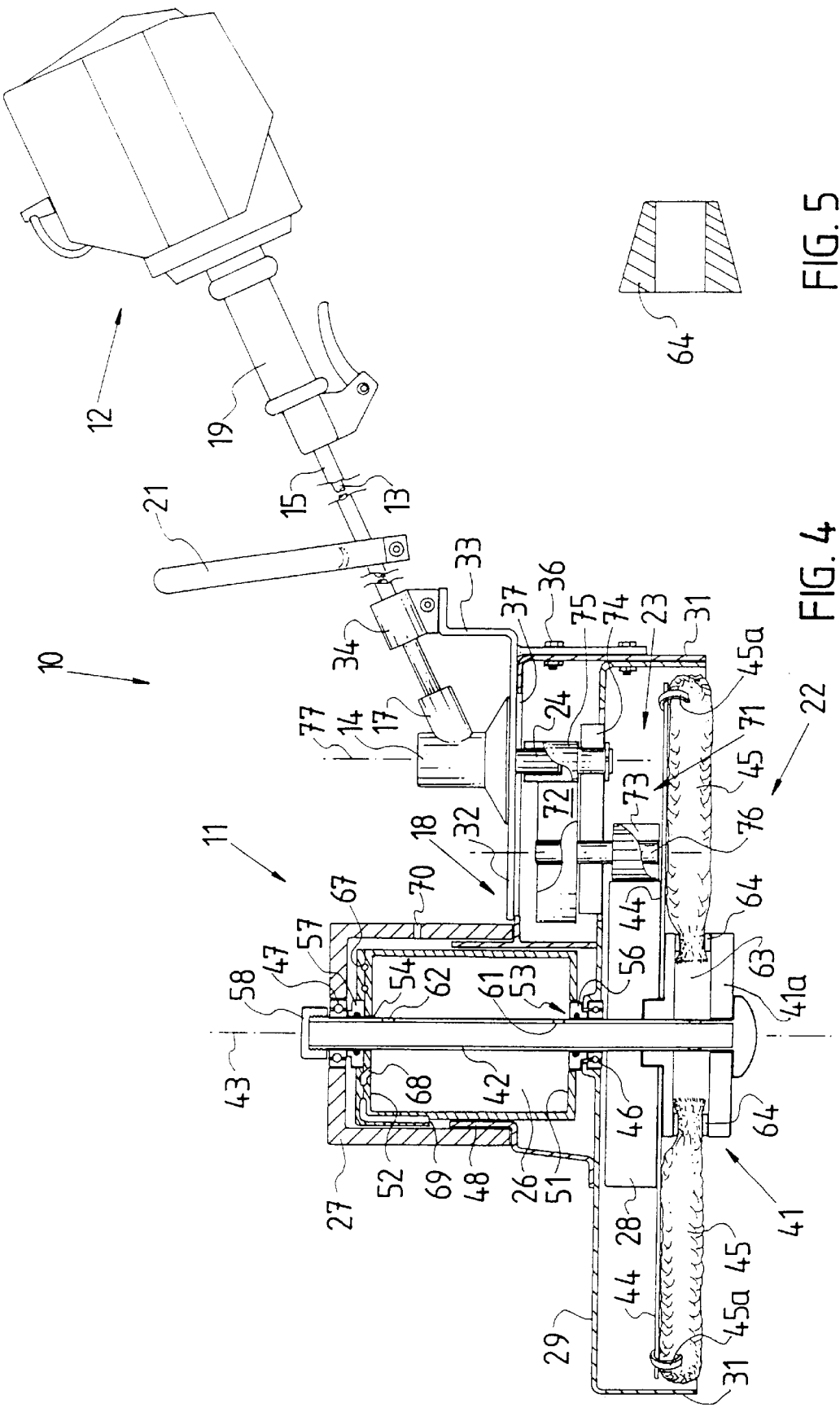
FIG. 4 is a sectional elevation along line 2—2 of an applicator according to the invention utilising the applicator head assembly of FIGS. 1, 2 and 3.
FIG. 5 is a sectional elevation of a gland used in the applicator of FIG. 6.
Figure 6:
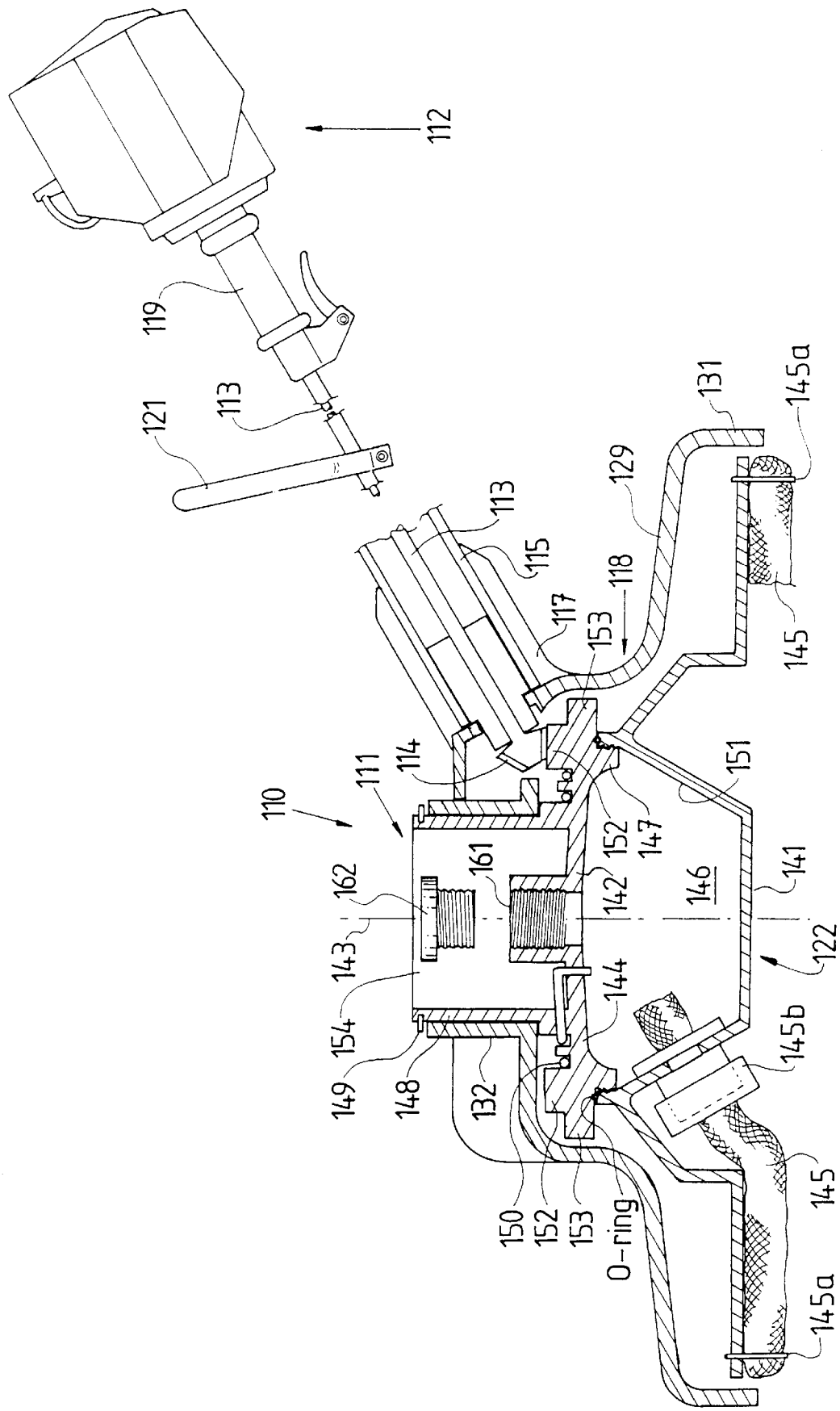
FIG. 6 is a sectional elevation of another applicator according to the invention along line 8—8 shown in FIG. 8.
Figure 9:
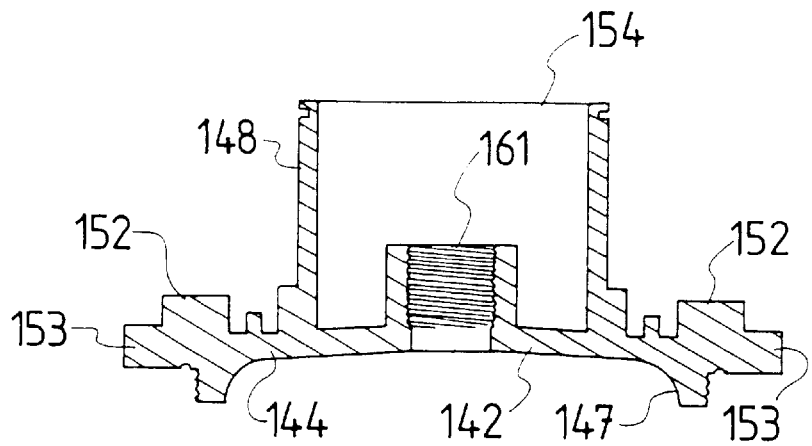
FIGS. 7, 8 and 9 are respectively a sectional elevation, plan view and side elevation of a moulded plastic lid or upper part of the rotor assembly of the applicator of FIG. 6.
Figure 8:
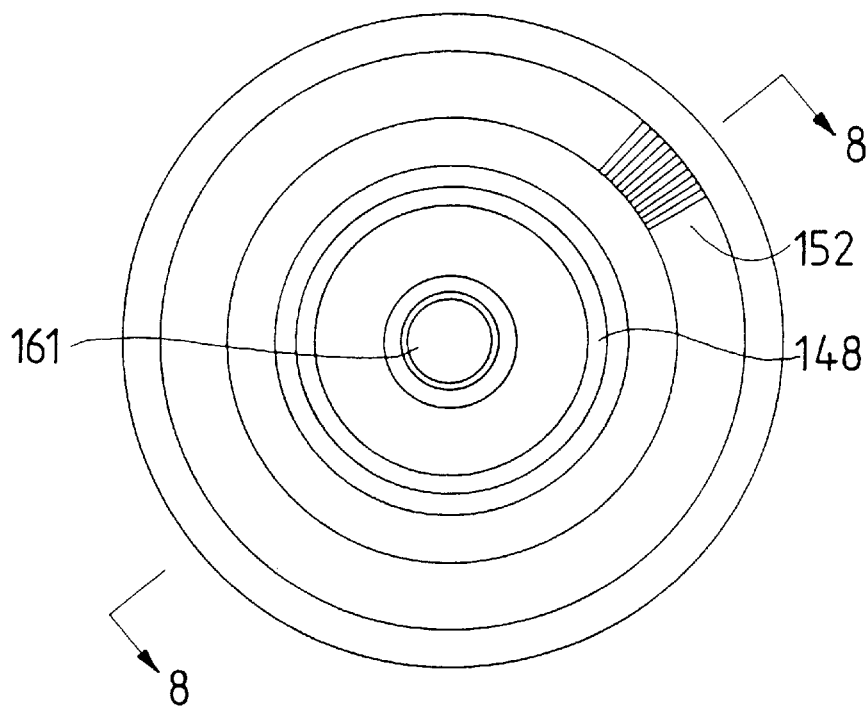
Figure 7:
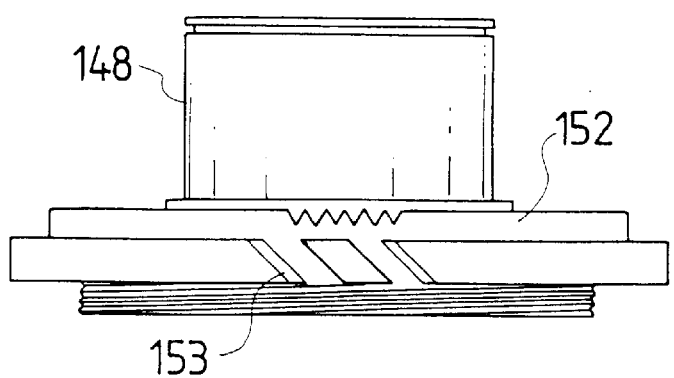

An aperture 61 is provided in the cylindrical wall of the hollow shaft 42 within the reservoir immediately above the lower end wall 51 and a similar aperture is provided within the reservoir immediately adjacent the upper end wall 52. The apertures provide liquid communication between the reservoir and the hollow shaft 42 which in turn communicates with the wicks 45 via a radially extending passage 63 provided in the hub 41a. It will be seen that the reservoir can be filled from above by removing the cap 58 and pumping or pouring liquid into the hollow shaft 42 whereupon it can flow into the reservoir via the apertures 61 and 62. In this particular embodiment the hub 41a has two bores 63 extending diametrically therethrough at right angles to each other with one applicator wick extending from one end of one bore to the end of the other bore ninety degrees angularly therefrom. Each end of the applicator wick is retained in the bore by a tapered bland 64 and more clearly illustrated in FIG. 5 which can be fitted to the wick with elastrator pliers and then forced into the bore 63 with the taper being effective to hold the wick in place.

It will be seen that the position of the angle drive 14 offset from the axis 43 allows the reservoir 26 to be located centrally of the rotor assembly for rotation with the shaft 42 whereby it can be easily filled from above. Furthermore the offsetting allows room for a drive train to be fitted for speed reduction whereby the rotor assembly can be driven at a speed of between 100 and 300 rpm although if higher or lower speeds are required the engine speed can be varied. In the embodiment illustrated, rotational drive is transferred from the angle drive shaft 24 to the drive wheels 29 by a cluster or set 71 of friction drive wheels comprising a large rubber wheel 72 which frictionally engages with a smaller steel wheel 75 threadedly connected to the angle drive shaft 24 and a small rubber wheel 73 which engages with the drive wheel 29, the two rubber wheels being fixed to a common shaft 73. The shaft 73 is rotatably mounted in a mounting plate 74 with the wheel 72 above the plate and the wheel 73 below the plate, and the steel wheel 75 is also rotatably mounted in the plate and held therein by a circlip. It will be seen that the angle drive shaft 24 maintains the plate 74 and its attached wheels in the desired plane of operation whereupon the plate 74 can be pivoted about the axis 77 of the angle drive shaft by a spring (not shown) to force the wheel 73 into engagement with the drive wheel 29.

In use, liquid is poured into the reservoir 26 upon removal of the cap 58 (which can be replaced by a quick hose coupling if desired) and the apparatus is then ready for use. The engine drives the rotor assembly 22 preferably at a speed of about 300 rpm via the drive train and liquid flows from the reservoir to the applicator wicks 45 via the aperture 53, the hollow shaft 42 and the bore 63. It will be seen that the glands 64 restrict the flow rate of liquid into the applicator wicks by causing the wicks to be tightly compressed.

The hand held motor driven applicator 110 illustrated in FIGS. 6 to 9 is similar in many respects to that illustrated in FIGS. 1 to 5 and includes an applicator head assembly 111 which is powered by a battery powered motor spaced from the head assembly and transferring rotary drive via a drive shaft 113 and bevelled gear 114, the shaft being housed in a hollow tube 115 which is secured at its upper end to the frame of the motor and at its lower end to an offset lug part 117 of the housing 118.

The applicator head assembly includes a rotor assembly 122 which is mounted in the housing 118 for rotation about a vertical axis 143. The housing has a circular cover portion 129 and a skirt 131 depending therefrom for shrouding the rotor assembly and a sleeve portion 132 above the cover portion which provides a mounting for the rotor assembly. The lug part 117 is moulded integrally with the cover portion 129 and the mounting portion 132. The rotor assembly has a lower part 141 and an upper part 142 which are secured together to define a chamber or reservoir 146 for storage of liquid chemical. For this purpose, the lower part is disc-like in form with a cup-like central recess 151 while the upper part has a circular base portion 144 which provides a complementary lid for the recess with a refill aperture 161 therein. An annular ring 147 depends from the base portion of the upper part and threadedly engages with the inner face of the recess to secure the two parts together and a cylindrical wall portion 148 extends upwardly from the base portion for mounting the rotor assembly as will be described later. The diameter of the disc-like lower port 141 is slightly less than the diameter of the housing so that it can rotate within the skirt 131. In this example both parts are moulded from polyurethane, but other materials such as aluminum alloy would be suitable. A plurality of applicator rope wicks 145 extend radially from the reservoir to the periphery of the disc and terminate in an end portion extending partially along its circumferential periphery, the wicks being held to the disc at their outer most portions by straps 145*a*. The rope wicks enter the reservoir via apertures formed in the wall of the recess 151 and are held therein by clamping glands 145*b*. In other embodiments, the rope wicks are woven through apertures provided in the disc instead of being fixed by straps. In use, liquid chemical stored in the reservoir 146 flows into the rope wicks under centrifugal force caused by rotation of the rotor assembly thus keeping the wicks moist for application to the weeds. The cylindrical wall portion 148 extending upwardly from the base portion 144 forms a hollow stub shaft which is journalled for rotation in the complementary sleeve 132 formed in the cover portion 129 of the housing and is retained therein by a circlip 149. The hollow of the shaft opens upwardly to provide access 154 for filling the reservoir as will be described more fully later. A ring of gear teeth (or ring gear) 152 is formed in the upper part 142 of the rotor assembly about the wall portion 148 and is adapted to receive rotational drive from the motor 112 via bevelled gear 114. Suitably, the ring of gear teeth is of fairly large diameter so that the gear ratio between the bevelled gear and the ring gear is about 12 to 1, so that suitable speed reduction is obtained without the use of a cluster of gears.

It will be seen that the position of the bevelled gear 114 offset from the axis 143 allows the reservoir 146 to be located centrally of the rotor assembly whereby it can be filled from above through the centrally located aperture 161 which can be selectively closed by the complementary screw threaded plug 162. Furthermore the offsetting allows for the ring gear to extend about the axis of rotation for effective speed reduction whereby the rotor assembly can be driven at a speed of between 100 and 300 rpm.

A plurality of fan blades 153 are also formed in the upper part radially outward of the ring gear for forcing air around the rotor assembly. In this particular embodiment, air is drawn in from air intake apertures provided in the elongate handle 115 adjacent the motor 112 (not shown) and exits adjacent the bevelled gear 114 thereby keeping the gears and other parts clean and cool. In other embodiments where the motor is mounted adjacent or in the lug 117, the fan may cause air to flow over the motor thus keeping it clean and cool.

A vent tube 150 is secured to the upper face of the base portion 144 with one end opening to the reservoir and the other end opening to atmosphere, the tube making two full concentric coils between its ends about the axis 143 and being effective to allow air into the reservoir whilst the rotor assembly is rotating, the direction of the coils being such that any liquid which happens to be in the coils is forced back into the reservoir. The apparatus described in patent application PCT/AU95/00065 includes a similar venting arrangement and reference may be made to that application for a clearer understanding.

The reservoir 146 can be filled from above by first removing the plug 162 and pumping or pouring liquid through the aperture 161. However, liquid can be more easily transferred to the reservoir if a quick release coupling is permanently fitted to the aperture for co-acting with a complementary fitting on a supply hose. It will be appreciated that inflowing liquid will cause any air in the reservoir to be forced out through the vent tube 150.

If desired, any liquid remaining in the reservoir after use of the applicator may be returned to the supply container by inserting a suction pump hose through the aperture 161 or alternatively the applicator may be inverted and a suction pump may be fitted to the quick release coupling if utilised. To assist with complete drainage of the reservoir the base portion 144 of the lid part tapers slightly upwardly to the refill aperture 161 which is thus the lowest point when the rotary assembly is inserted.

A user may operate an applicator according to the present invention in gullies and on banks and the like where tractor drawn applicators are unsuitable or impractical, the operator being able to guide the applicator such that the wicks 145 contact plants and apply weedicides or other chemicals thereto whereby those plants may die in a plane above the desired short grasses. Furthermore, the present invention allows construction in relatively lightweight materials due to its relatively low speed and low power requirements.

Various other modifications of the invention are contemplated which will be apparent to persons skilled in the art, and which can be resorted to without departing from the spirit and scope of the invention as defined in the appended claims.

I claim:

1. A hand held motor driven applicator for applying liquids selectively to undesired plants in a field, garden or crop including:

a motor;

a rotor assembly including a rotatable wick support having one or more applicator wicks attached thereto, said rotor assembly being supported for rotation, in use, about a vertical axis by a housing which at least partially covers said rotatable wick support, and a centrally mounted shaft extending upwardly, in use, from said rotatable wick support and being rotatably mounted in bearings or journals provided in said housing;

drive means operatively connected to said motor and said rotor assembly for transferring rotary drive from said motor to said rotor assembly, said drive means including a drive shaft or cable housed in an elongate handle and drivingly connected to said rotor assembly via speed reduction means;

storage means in liquid communication with said one or more applicator wicks for storing a quantity of liquid for supplying said one or more wicks with liquid while said rotor assembly is rotating, said storage means including a cylindrical container which is secured to said centrally mounted shaft for rotation therewith between a lower bearing and an upper bearing in said housing, said centrally mounted shaft being hollow and the hollow of said shaft being in liquid communication with said container and said one or more applicator wicks; and said elongate handle being operatively connected to said housing whereby a user may maintain said rotor assembly proximal to the undesired plants and whereby said applicator wicks may apply liquid to the undesired plants upon contact.

2. An applicator according to claim 1, wherein said speed reduction means is arranged to drive said rotor assembly at about 300 rpm.

3. An applicator according to claim 1, wherein said rotatable wick support has a central hub having a recess therein which forms said storage means and said centrally mounted shaft is a large diameter open topped hollow stub shaft extending from said central hub and journalled in a complementary sleeve provided in said housing to rotatably support said rotor assembly, said open top providing access to an aperture in said central hub for refilling said storage means.

4. An applicator according to claim 3, wherein said storage means is vented so that atmospheric pressure in said storage means is maintained during operation of the applicator.

5. An applicator according to claim 1, wherein said speed reduction means includes an angle drive offset from said vertical axis.

6. A hand held motor driven applicator for applying liquids selectively to undesired plants in a field, garden or crop including:

a motor;

a rotor assembly including a rotatable wick support having one or more applicator wicks attached thereto, said rotor assembly being supported for rotation, in use, about a vertical axis by a housing which at least partially covers said rotatable wick support;

storage means in liquid communication with said one or more applicator wicks for storing a quantity of liquid for supplying said one or more wicks with liquid while said rotor assembly is rotating, said storage means being vented so that atmospheric pressure in said storage means is maintained during operation of the applicator;

an elongate handle operatively connected to said support means by which a user may maintain said rotor assembly proximal to the undesired plants whereby said applicator wicks may apply liquid to said undesired plants upon contact;

drive means operatively connected to said motor and said rotor assembly for transferring rotary drive from said motor to said rotor assembly, said drive means including a drive shaft or cable housed in said elongate handle and drivably connected to said rotor assembly via speed reduction means;

said rotatable wick support including a lower part and an upper part, said lower part being disc-like in form with a cup-like central recess, and said upper part being secured to said lower part to define a chamber between said upper and lower parts and said chamber forming said storag means, and one or more apertures being provided in a wall of said recess and said one or more applicator wicks extending radially from said recess towards the periphery of said lower part and a portion of said one or more applicator wicks respectively passing through a respective aperture and being retained therein.

7. An applicator according to claim 6, wherein said storage means has an upper end and is vented by a tube or passage having an inner end and an outer end, said tube or passage extending circuitously around said storage means adjacent said upper end and in fluid communication with said storage means at said inner end and open to the atmosphere via said outer end.

8. An applicator according to claim 6, wherein a ring of gear teeth (or ring gear) is formed in said upper part of said rotatable wick support and is adapted to receive rotational drive from said drive shaft via a bevelled gear.

9. An applicator according to claim 8, wherein a plurality of fan blades are formed in said upper part radially outward of said ring of gear teeth for forcing air around said rotatable wick support.

10. An applicator according to claim 6, wherein said one or more applicator wicks are retained in their respective apertures by a tapered gland.

* * * * *